(12) United States Patent
Jain et al.

(10) Patent No.: US 6,299,565 B1
(45) Date of Patent: Oct. 9, 2001

(54) CONTROL STRATEGY FOR AN AUTOMATIC TRANSMISSION

(75) Inventors: Pramod Kumar Jain, Farmington Hills; Balaram G. Sankpal; Hong Jiang, both of Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/442,604

(22) Filed: Nov. 18, 1999

(51) Int. Cl.[7] .......................... F16H 61/04; F16H 61/06; F16H 61/08
(52) U.S. Cl. ..................... 477/143; 477/146; 475/128
(58) Field of Search ..................... 477/34, 97, 143; 475/128, 122

(56) References Cited

U.S. PATENT DOCUMENTS

| | | | |
|---|---|---|---|
| 4,928,227 | * 5/1990 | Burba et al. | 364/424.01 |
| 4,938,097 | 7/1990 | Pierce . | |
| 5,389,046 | 2/1995 | Timte et al. . | |
| 5,577,584 | * 11/1996 | Ortmann | 192/85 R |
| 6,110,068 | * 8/2000 | Kraska | 475/146 |

\* cited by examiner

Primary Examiner—Sherry Estremsky
Assistant Examiner—Tisha D. Lewis
(74) Attorney, Agent, or Firm—Frank G. McKenzie

(57) ABSTRACT

An automatic control strategy for use with a multiple-ratio transmission in an automotive vehicle driveline in which the crankshaft of an internal combustion engine is connected directly to torque input elements of multiple-ratio gearing without an intervening hydrokinetic torque converter. The strategy is adapted especially for use with a wet auto clutch to provide forward or reverse drive engagement during vehicle launch and during transient damping of driveline disturbances. The strategy makes it possible to control the clutches to achieve maximum vehicle acceleration by controlling the engine speed so that it operates at maximum torque throughout the useful engine speed range for any given engine throttle position. The entry and exit conditions for each drive mode are determined by the strategy so that optimum drive-away performance and optimum shift control, as well as soft clutch engagement and full clutch engagement, can be achieved.

19 Claims, 5 Drawing Sheets

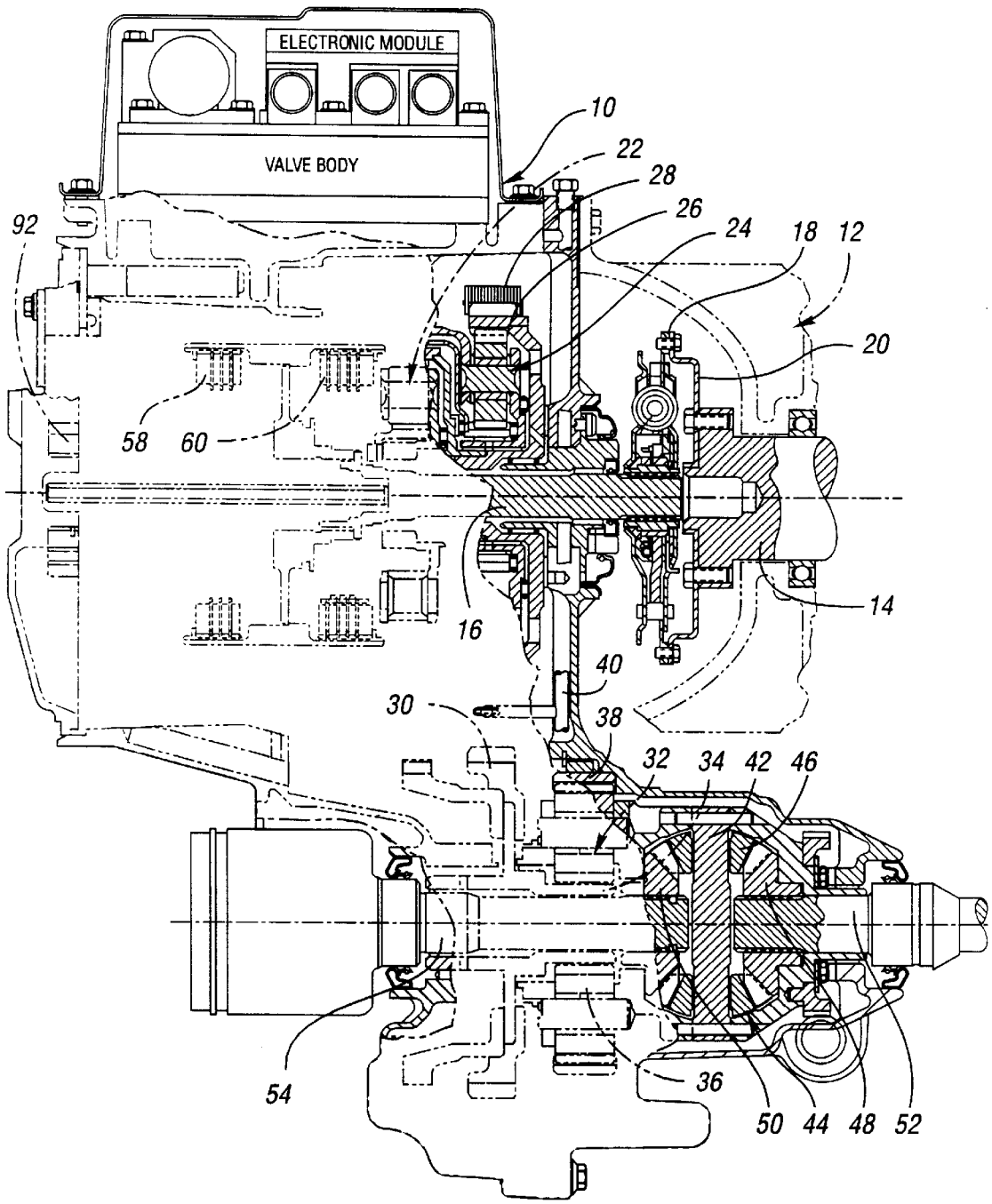

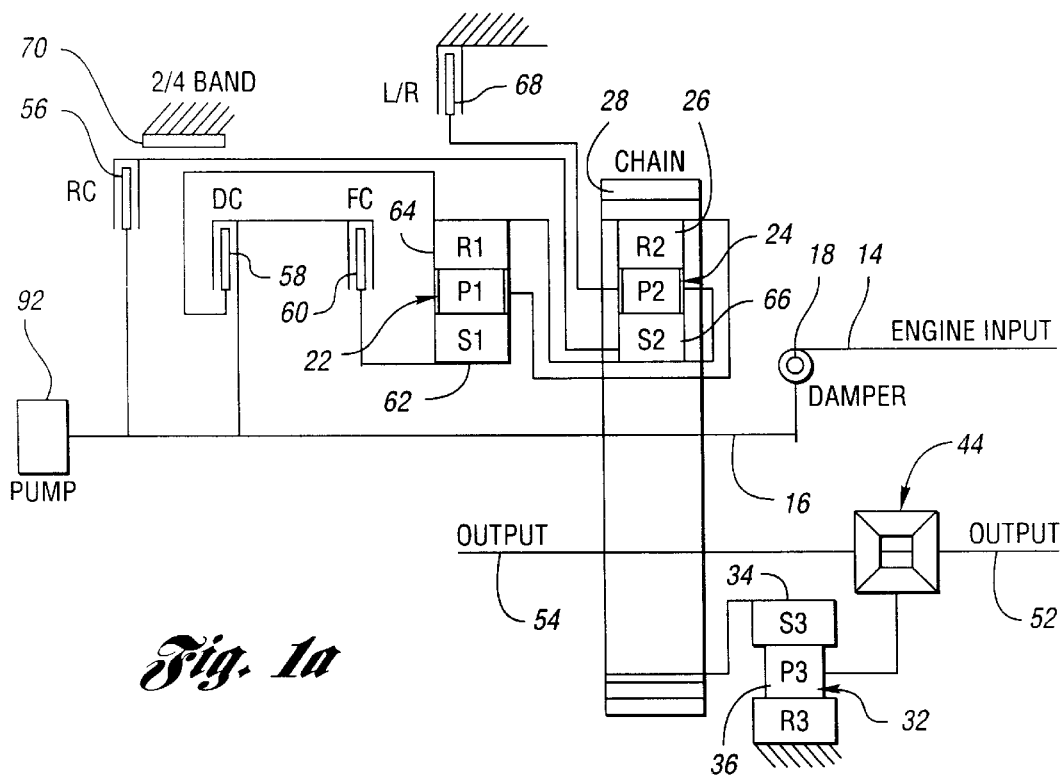
*Fig. 1a*
*Fig. 1b*
| GEAR | RC | FC | DC | L.R | 2.4 | RATIO |
|---|---|---|---|---|---|---|
| 1ST |  | X |  | X |  | 2.889 |
| 2ND |  | X |  |  | X | 1.571 |
| 3RD |  | X | X |  |  | 1.000 |
| 4TH |  |  | X |  | X | 0.698 |
| REV | X |  |  | X |  | 2.310 |
| X = ELEMENT TRANSMITS TORQUE | | | | | | |
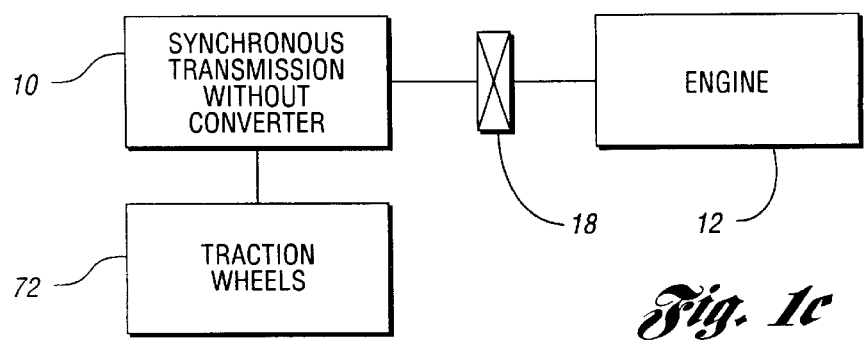
*Fig. 1c*

CONTROL STRATEGY FOR AN AUTOMATIC TRANSMISSION

TECHNICAL FIELD

The invention relates to a control strategy for controlling engagement of a forward drive clutch or a reverse drive clutch in a vehicle driveline that does not include a hydrokinetic torque converter.

BACKGROUND ART

In conventional multiple-ratio transmissions, a hydrokinetic torque converter typically is included in the driveline. It is located between the crankshaft of an internal combustion engine and the multiple-ratio gearing that establishes torque flow paths to the vehicle traction wheels. Attempts have been made to eliminate the torque converter from the driveline in order to eliminate the inherent hydrokinetic efficiency losses at the converter. Elimination of the torque converter also reduces the rotary mass of the torque transfer elements at the input side of the multiple-ratio gearing. A transmission of this kind may be seen by referring to copending U.S. patent application Ser. No. 09/353,289, filed Jul. 15, 1999. This application is assigned to the assignee of the present invention.

A gearing arrangement that is capable of being used with the control strategy of the present invention is shown in U.S. Pat. No. 4,938,097. The strategy of the present invention complements the control strategy shown, for example, in U.S. Pat. No. 5,389,046. The complete hydraulic circuit and electronic control strategy for a transmission of the kind shown in the '097 patent is disclosed in the '046 patent. The '097 patent and the '046 patent, as well as application Ser. No. 09/353,289, are incorporated herein by reference.

DISCLOSURE OF INVENTION

The invention may be used in the control of a forward drive clutch and a reverse drive clutch for a multiple-ratio transmission of the kind disclosed in copending application Ser. No. 09/353,289. It may be used also with a lay shaft manual transmission, where a forward drive clutch and a reverse drive clutch selectively deliver torque to a forward drive torque input gear and to a reverse drive torque input gear. Further, it may be used in a continuously variable transmission having driving and driven sheaves with an endless belt.

Although the invention has been disclosed herein with a transmission having forward and reverse clutches, it may be used also with an auto-clutch, or stand-along clutch, between the engine and the transmission gearing.

The invention comprises control logic that consists of multiple operating modes. These modes include a fill mode during which the clutch is filled with activating fluid, a stroke mode in which the clutch is stroked to a position at which incipient torque transfer will occur, a creep mode during which a minimal torque transfer across the clutch is achieved as the engine throttle is at a zero setting, a drive-away mode during which the engine is operating at an advanced throttle and the clutch is fully engaged, a soft-lock mode which accommodates torque transfer through a slipping clutch, a hard-lock mode during which the clutch is fully engaged, a shift mode wherein the control valve system effects ratio changes in response to changing operating variables for the driveline, a tip-out mode during which torque transfer is controlled as the vehicle operator relaxes the engine throttle quickly, and a tip-in mode during which the engine throttle is advanced rapidly.

The control strategy establishes the conditions that must be met to achieve entry or exit from any of the operating modes for the control system. The driveline variables that establish conditions for entry into or exit from any of the modes are tested during each control loop of the microprocessor. If the exit conditions for any given mode are satisfied, the control logic for the mode that is entered from the existing mode is executed. If the exit conditions are not met for any given mode, the control routine will remain with that current mode and the control logic for that mode will continue to be executed.

The control logic of the invention makes it possible to achieve a rapid and smooth engagement of a friction clutch during vehicle launch in forward drive and reverse drive. It is also possible to achieve a vehicle creep mode, assuming the necessary entry conditions for that mode are detected by the processor whenever the transmission range selector is not in the neutral or park positions and the vehicle brakes are not applied.

The strategy will make it possible to achieve maximum acceleration with maximum engine torque for any given engine speed and for any given engine throttle position. The acceleration is obtained with maximum smoothness during the launch period.

The strategy of the invention will permit transient damping of the clutch by allowing the clutch to slip with a controlled degree of slip during the so-called tip-in and tip-out control states as the engine throttle is rapidly advanced or retarded.

Maximum vehicle acceleration is achieved by controlling the engine speed so that the engine operates at its maximum torque value for any given engine throttle position.

BRIEF DESCRIPTION OF DRAWINGS

FIG. 1 is a partial sectional view of a transmission for an automotive vehicle driveline wherein the engine crankshaft is connected to the torque input elements of the gearing through a damper rather than through a hydrokinetic torque converter;

FIG. 1a is a schematic representation of the gearing elements for the transmission of FIG. 1;

FIG. 1b is a chart showing the clutch and brake engagement and release pattern for the transmission of FIG. 1;

FIG. 1c is a block diagram showing the relationship of the transmission with respect to the engine and the traction wheels;

BEST MODE FOR CARRYING OUT THE INVENTION

Figure 2:
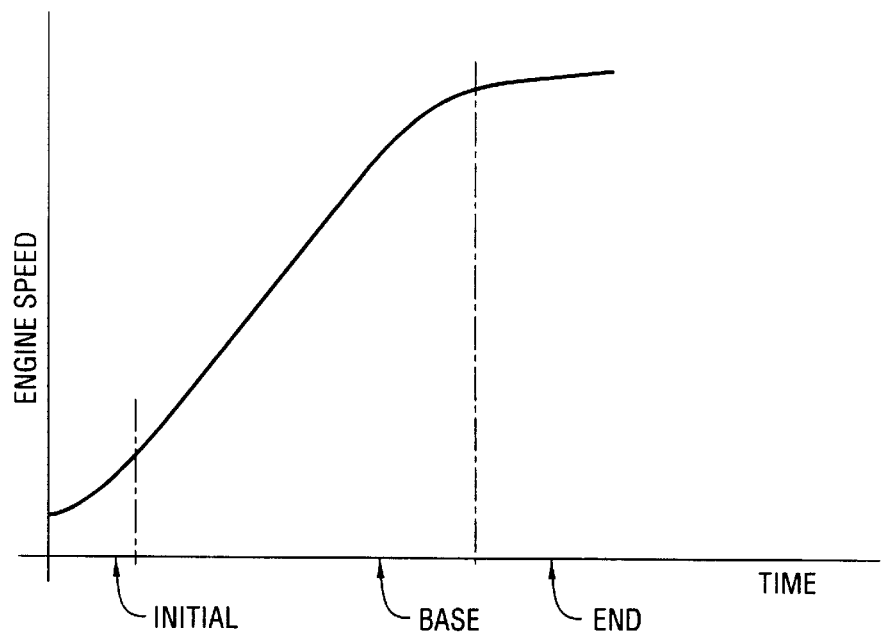
FIG. 2 is an engine speed profile representation wherein the desired engine speed is plotted against engagement time for the clutch.

FIG. 1 shows in schematic form a multiple-ratio automatic transmission identified by reference numeral 10 and an internal combustion engine 12. The engine 12 includes a crankshaft 14, which is coupled to a torque input shaft 16 for the transmission 10. That coupling is achieved by a damper assembly 18 of conventional construction. The torque input side of the damper 18 may be connected to the crankshaft 14 by a drive plate 20.

The transmission 10 includes a first planetary gearset 22 and a second planetary gear set 24. Ring gear 26 of the gearset 24 defines a drive sprocket for a drive chain 28, which extends to driven sprocket 30 of a final drive planetary gear unit 32.

The torque input gear element of planetary gear unit 32 is sun gear 34, which is engaged by planetary pinions 36. The ring gear 38 of the gear unit 32 is anchored to transmission housing 40.

The carrier for the planetary pinions 36 drives the differential carrier 42 of a differential gear unit 44. Planetary bevel pinions 46 on the carrier 42 engage each of two side gears 48 and 50. Each side gear 48 and 50 is connected drivably to axle half shafts, as shown at 52 and 54, respectively. Each axle half shaft is connected to a vehicle traction wheel.

The planetary transmission includes a reverse clutch 56, a direct-drive clutch 58, and a forward-drive clutch 60. The function of these clutches will be described generally with reference to the schematic diagram of FIG. 1a.

As seen in FIG. 1a, the engine crankshaft 14 is connected to torque input shaft 16, which transfers torque to sun gear 62 of the planetary gear unit 22 through forward clutch 60, which is engaged during operation in each of the first three forward driving gear ratios. Input shaft 16 is connected through direct clutch 58 to a ring gear 64 during operation in the third forward driving speed ratio.

The torque of the ring gear 64 is transferred through the planetary carrier of gear unit 24. The carrier for gear unit 64 is connected to ring gear 26 of the gear unit 24. Torque input shaft 16 is connected through the reverse clutch 56 to the sun gear 66 of the gear unit 24.

The carrier for the gear unit 24 is selectively anchored by a low-and-reverse disc brake 68 during reverse drive and during low-speed ratio operation.

FIG. 1b shows the clutch and brake engagement and release pattern for the clutches and brakes shown in FIG. 1a. The clutches and brakes are engaged and released selectively to establish each of four forward-driving ratios and a single reverse ratio. The symbols RC, FC, DC, L/R and 2/4, indicated in FIG. 4, designate the clutches and brakes that are similarly designated in FIG. 1a. These clutches and brakes are identified by reference numerals 56, 60, 58, 68 and 70, respectively. Brake 70 anchors sun gear 66 during second ratio operation and fourth ratio operation, the latter being an overdrive ratio.

FIG. 1c is a general block diagram showing the driveline for an automotive vehicle. The engine crankshaft for engine 12 is connected directly to the transmission 10 by the damper 18. The output half shafts for the traction wheels 72 are connected to the planetary gear unit 32 through differential gear unit 44.

Figure 3:
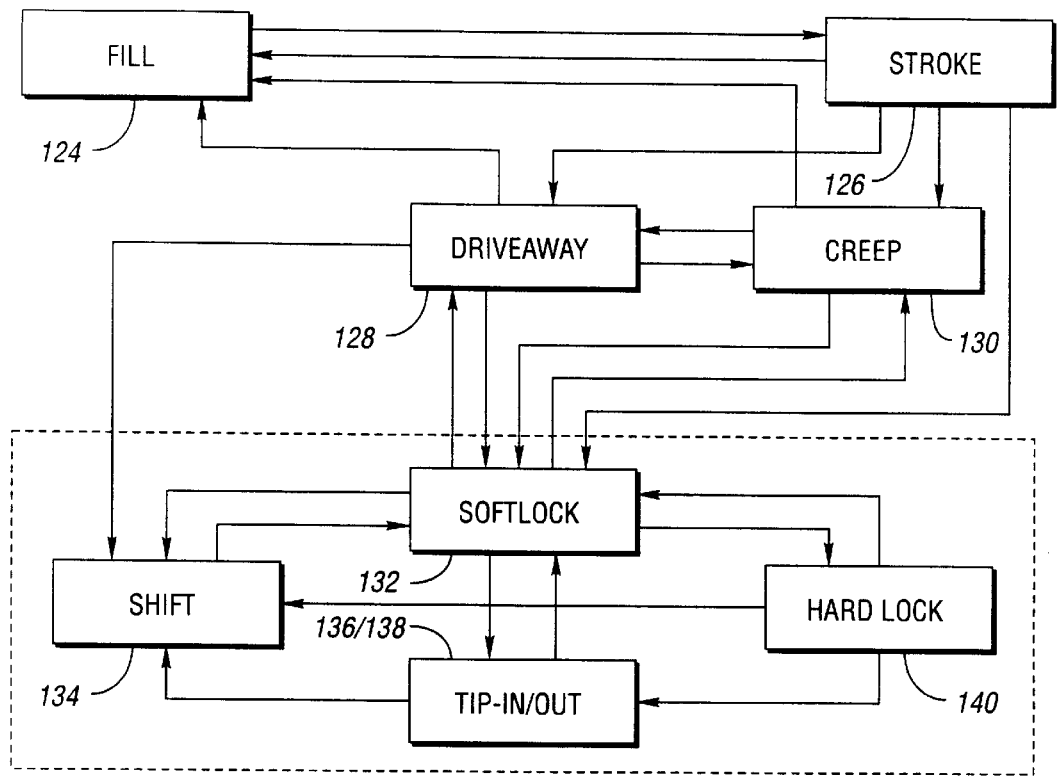
FIG. 3 is a block diagram of the various operating modes including allowed transition paths between the modes.

The auto clutch control logic of the invention consists of nine modes, which are identified in FIG. 3. These are the fill mode, the stroke mode, the creep mode, the drive-away mode, the soft-lock mode, the hard-lock mode, the shift mode, and the tip-in and tip-out modes.

Figure 4:
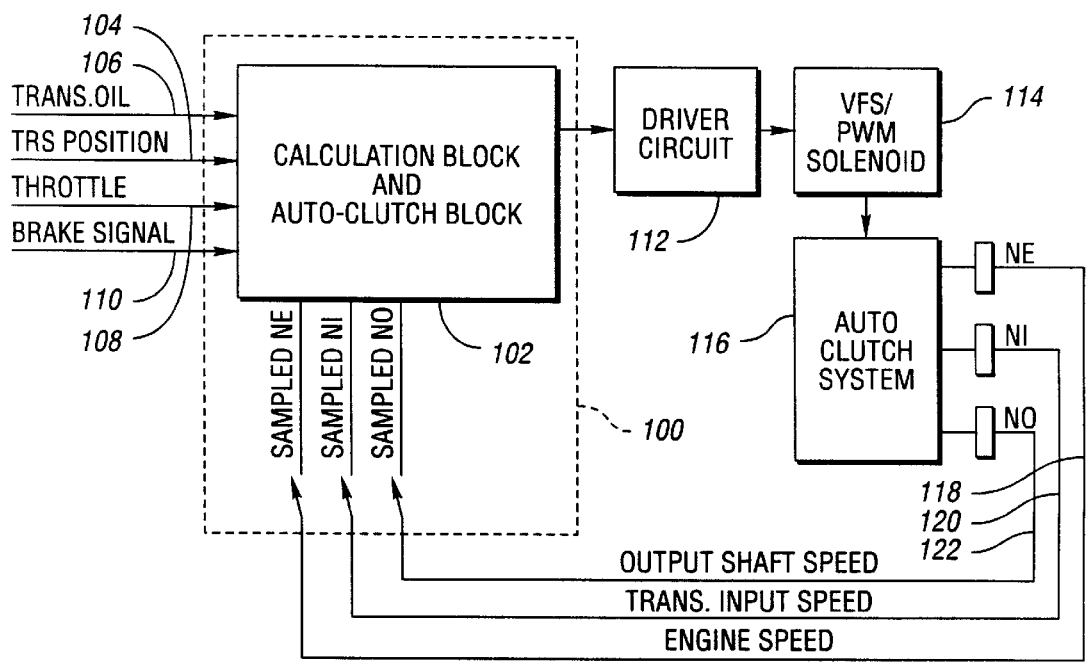
FIG. 4 is a block diagram of the electronic control system for controlling the clutch in response to driveline variables, including engine operating variables.

FIG. 4 shows the microprocessor controller at 100. It includes a calculation block and an auto clutch block at 102, which receives input signals from the transmission oil temperature signal flow path 106, the transmission range selector position signal flow path 104, the engine throttle position signal flow path 108, and the wheel brake signal flow path 110. A driver circuit 112, which may be part of the microprocessor 100, delivers the output of the processor to the solenoid valve 114. This valve may be a variable-force solenoid or a pulse-width modulated solenoid. The solenoid valve 114 controls the auto clutch system 116. The engine speed signal at the output side of the auto clutch system is delivered through signal flow path 118 to the calculation block 102. Likewise, a clutch input speed signal, which is a measured signal, is transferred through a signal flow path 120 to the block 102. The output speed for the auto clutch system 116 is delivered through signal flow path 122 to the block 102.

The entry conditions for the fill mode shown at 124 in FIG. 3 require the transmission range selector to be in either the park position or the neutral position. The control strategy then may exit to the stroke mode at 126. If the range selector is not in the park or neutral positions, the pressure that exists in the clutch during the fill mode is the commanded pressure necessary to keep the lines filled with fluid.

When the control sequence is in the stroke mode at 126, the control may exit to the drive-away mode at 128 if the throttle position is greater than a low value, such as 2.5 percent throttle, and if a vehicle speed is very low (for example, below 5 mph). The processor will also determine whether the stroke phase is complete before an exit may be made to the drive-away mode. The stroke phase is indicated to be complete if the engine speed drops slightly as the friction elements of the clutch begin to engage. Completion of the stroke phase can be detected also by measuring the clutch pressure and determining whether it is equal to or above the stroke pressure.

As indicated in FIG. 3, the control sequence may exit the stroke mode to the drive-away mode 128, or to the creep mode 130, or to the soft-lock mode 132. The control will exit to the creep mode if the vehicle speed is less than 5 mph and the stroke phase is complete. The soft-lock mode will be entered if the vehicle speed is equal to or greater than 5 mph and the stroke phase is complete.

If provision is made for using a clutch pressure sensor, the control strategy for exiting the stroke mode may use a closed-loop pressure feedback. This involves two phases: a so-called boost phase and a stroke phase. In the boost phase, the pressure commanded is the boost pressure in the clutch. A timer is started, and it is not possible to exit the boost phase until the timer runs down. This will make certain that the piston of the clutch will be fully stroked during the stroke phase.

The control strategy requires a determination of the desired pressure, which is a function of torque and a function of temperature. The processor then determines any error between the desired pressure and the actual pressure. The new commanded pressure then is equal to the old commanded pressure plus the error. This is determined by a closed-loop pressure control wherein the change in pressure or the error is added to the old commanded pressure using a proportional-integral-derivative closed-loop control.

If the control system does not include a pressure sensor, the boost phase again involves exiting to the stroke phase after the timer has expired. As in the previous case, the commanded pressure is equal to the boost pressure, and the boost time is a function of engine throttle position and temperature, which are calibration variables that are stored in RAM locations. The boost pressure is represented by a calibration parameter located in ROM.

After the boost phase is complete, the processor enters a stroke phase where ramping of the pressure occurs. A timer is used to determine the length of the ramp phase during which the clutch pressure is increased. The commanded pressure is a function of torque and temperature, and the stroke time established by the timer is one of the calibration parameters.

As seen in FIG. 3, it is possible to enter the creep mode 130 from the stroke mode 126. The conditions for entering the creep mode requires the brakes to be applied until the engine is about to stall. Alternatively, the vehicle may coast down to a low speed with a throttle position less than 1.5 percent and with an engine speed less than about 1100 rpm. This condition is expressed as follows:

$$(vs_{13}\ rate<-2\ mph/loop\ \&\ vs<10\ mph)$$

or $$(ne\_rate<-100\ rpm/loop\ \&\ ne<1000\ rpm)$$

If the vehicle is decelerating, a rate less than 2 mph per control loop (which may be about 16 ms) and a vehicle speed less than 10 mph will satisfy the entry conditions.

The processor may exit to the drive-away mode 128 if the throttle position is greater than 2.5 percent and the vehicle speed is less than about 5 mph. The processor then will exit to the soft-lock mode 132 if the vehicle speed is greater than or equal to about 5 mph. The control strategy for the creep mode, when the brakes are applied, is expressed as follows:

$$pr\_cmd=pr\_cmd\ (start\ of\ mode)+PRDLCRLO\ (low\ creep)+PKAM$$

If the brakes are off, the control strategy for the creep mode is expressed as follows:

$$pr\_cmd=pr\_cmd\ (start\ of\ mode)+PRDLCRLHI\ (high\ creep)+PKAM$$

In the foregoing equations, the expressions "PRDLCRLO" and "PRDLCRHI" are calibration parameters, and the term "PKAM" is an accumulated learned value from the preceding engagements.

The control strategy can use a lookup table to obtain the control parameters; or, if the system includes a clutch pressure sensor, a closed-loop control may be used.

If the strategy is in the drive-away mode 128, it may exit to the shift mode 134 where transmission shifting may occur, provided the clutch slip is less at 100 rpm. The strategy may exit to the creep mode 130 during hard braking at low vehicle speeds or during low throttle and low vehicle speed operation. The strategy may exit to the soft-lock mode 132 from the drive-away mode 128 when the clutch slip is less than 100 rpm or the maximum allowed time has expired or when the vehicle acceleration is less than the normal vehicle acceleration, and the clutch output speed is high enough so that the engine will provide a minimum acceptable acceleration after the clutch is fully locked. If the clutch thermal capacity is exceeded, provision is made for exiting the drive-away mode.

The control strategy for the drive-away mode consists of an initial drive-away phase, a capacity phase, a speed square phase, an engine speed profile phase, and an engine speed control phase. The engine speed target is equal to the maximum torque speed or the target speed for the current throttle position.

During the initial drive-away phase, the control strategy is expressed as follows:

$$pr\_cmd=pr\_cmd\ (in\ creep\ mode)+fn(tp\_flt)\ (pressure\ is\ increased\ gradually)$$

If the control strategy is used in a control system with electronic throttle control (e.g., a drive-by-wire control), the expression for filtered throttle position can be replaced with a term representing actual accelerator pedal position.

If the actual time allowed for the initial drive-away phase has expired, or the engine speed is greater than the target speed times a calibration multiplier, and the engine speed is greater than the minimum engine speed in the initial phase, the control strategy for the capacity phase is expressed as follows:

tq_target=fn(peak torque desired for current tp)

Generate desired clutch capacity profile using a profile shaping function. If engine speed is rising, Tq_dl_des=fn(tq_target−tq_des_old)

Tq_des_new=tq_des_old+tq_dl_des else maintain previous loop torque (alternatively a first order filter may be used to raise torque to tq_target)

Convert capacity to pressure (pr_cmd=capacity/gain_cl+stroke pressure)

Alternate logic:
  Set base pressure=fn(ne_target)
  Set unfiltered commanded pressure=base pressure+ramp (function of tp_flt). The ramp provides a gradually increasing pressure.
  If engine speed or the clutch slip is rising, the clutch pressure is commanded by filtering commanded pressure using a first order filter. The time constant of the filter is a function of throttle position.

attain pr_cmd_new either through a lookup table: fn(pr_cmd), or closed-loop control.

The processor control routine will exit to the speed square phase after the maximum allowed time has expired or the engine speed is greater than the target speed times a calibration multiplier and the engine speed is greater than the minimum engine speed in the capacity phase.

The speed square phase, however, is optional. Instead of entering the speed square phase, the strategy routine usually will skip the speed square phase and then enter the engine speed profile phase of the drive-away mode.

When the routine enters the speed square phase of the drive-away mode, the strategy attempts to emulate the function of a torque converter or fluid coupling within the system torque limits.

The control strategy for accomplishing this is expressed as follows:

torque=$ne^2$ * TR/$K^2$ where TR=fn (clutch out speed/clutch input speed) and K=fn(clutch out speed/clutch input speed) if (engine speed is rising) pr_cmd_new=(torque/$GAIN_{cl}$+PRSTRK) else maintain previous loop pressure attain pr_cmd_new either through a lookup table: fn(pr_cmd), or closed-loop control. The closed-loop control is used if the system has a clutch pressure sensor.

After the speed square phase is complete, the routine will exit to the engine speed profile phase. This occurs when the maximum allowed time has expired or the engine speed is greater than the target speed times the calibration multiplier and the engine speed is greater than a minimum speed in the speed square phase.

Figure 2A:
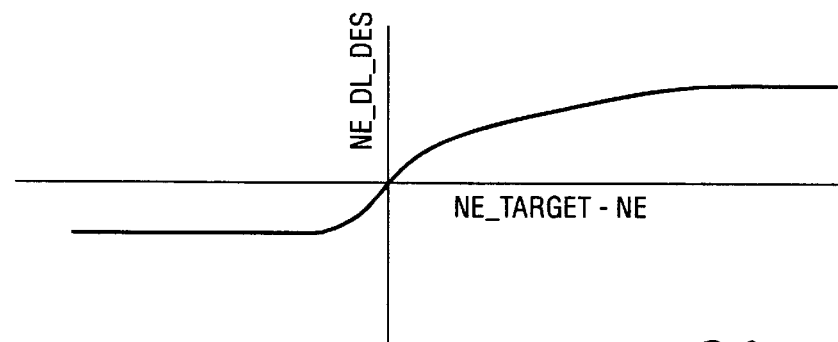
FIG. 2a is a plot of a desired change in engine speed calibration variable as a function of engine target speed during a clutch engagement interval.
Figure 2B:
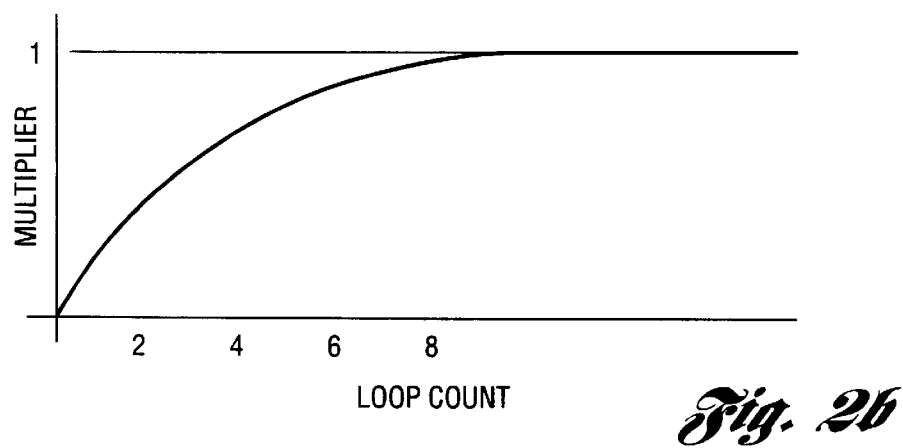
FIG. 2b is a plot of a calibration multiplier for the desired engine speed change plotted in FIG. 2a, the multiplier being dependent upon the control loop count for the microprocessor during the engagement interval.

Upon entering the engine speed profile phase, the control strategy controls the engine to the engine speed profile seen in FIG. 2. The engine speed is allowed to rise according to a profile that is shaped by a calibratable function. The initial portion of the profile is further adjusted by a multiplier, which is a function of the loop count. This is seen in FIG. 2b. FIG. 2a is a plot of the desired delta speed or the change in engine speed, which is a function of the difference between the target speed and the actual speed that exists. This engine speed shaping strategy is represented as follows:

ne_dl_des=fn(ne_target−ne_flt)

Limit change in ne_dl_des to within physical capabilities of the system ne_dl_des=ne_dl_des * fn(loop_count) (modify initial profile speed increase)

ne_des=ne_flt+ne_dl_des−ne_rate (rate of change of engine speed)

error=ne_des+ne_flt

ΔPr=pid(error, kp, kl, kd, kc(tp_flt))

pr_cmd_new=pr_cmd_old+ΔPr

After each mode is completed, a new commanded pressure is computed in the fashion described in the preceding equation. This results in a new pressure and the clutch pressure control solenoid.

After the engine speed profile phase is complete, the strategy will enter the engine speed control phase. This occurs when the engine speed is greater than or close to the target speed and the engine speed increase rate is not too high. The control strategy for the engine speed control phase is expressed as follows:

ne_dl_des=fn(ne_target−ne)

clip ne_dl_des to a small positive or negative value with a clip on total change from base ne_target repeat the logic as described for speed profile control phase (see above).

If the control routine has entered the soft-lock mode 132, it is possible to exit the soft-lock mode and go directly to the shift mode 134 or to the creep mode 130, or to the drive-away mode 128, or to the tip-in mode 136, or to the tip-out mode 138, or to the hard-lock mode 140. The conditions that exist for exiting to each of these modes is expressed as follows:

Exit to SHIFT MODE
  flg_shf indicates shifting is occurring
Exit to CREEP MODE
  Low throttle and low vehicle speed
  or hard braking and lower vehicle speed
  or abort from drive-away and low vehicle speed
Exit to DRIVE-AWAY MODE
  tp_flt>2% (for example), and low vehicle speed, and high clutch slip
Exit to TIP-IN MODE
  Not shifting, and high throttle increase rate, and throttle above a min. threshold
Exit to TIP-OUT MODE
  Not shifting, and high throttle decrease rate, and throttle below a threshold
Exit to HARD-LOCK MODE
  Vehicle speed above a threshold, and low clutch slip.

When the soft-lock mode 132 is entered, the clutch is allowed to slip. This requires the computation of a slip target, which is a function of clutch output speed, throttle position and the current gear. If the target slip is less than about 4 rpm, the processor will increase the clutch pressure gradually to get approximately an additional 10 percent capacity.

The foregoing control strategy for soft-lock assumes the system does not have a pressure sensor.

If the target slip is equal to or greater than about 4 rpm, the strategy would be as follows:

Slip_dl_des (change in desired slip)=fn(slip_act) (actual slip)

Slip_cmd=slip_act+sl_dl_des−slip_rate (rate of change of slip)

error=slip_cmd−slip_act

Δpr=pid (error, $k_p$, $k_I$, $k_d$, $k_c$ (error))+Δpr from torque feed-forward pr_cmd_new=pr_cmd_old+Δpr If the operator "steps in" the throttle or "steps out" the throttle, the processor will compute the clutch pressure based on the corresponding torque that would exist. This provides an immediate pressure change at the clutch. There is no need to compute an error in pressure and to then, using closed-loop feedback, compute an error signal for a pressure change. This procedure is known in the industry as "torque feed-forward control".

If the control routine of the processor enters the tip-in mode 136, it is possible to exit to the shift mode 134, or the soft-lock mode 132, or the tip-out mode 138. Exit to the shift mode can be accomplished when a shift flag is set indicating that a shift is occurring. Exit to the soft-lock mode can take place if a tip-in timer has expired. Exit to the tip-out mode takes place when the transmission is not shifting and a high throttle decrease rate exists and the throttle setting is below a threshold value. The control strategy during the tip-in mode reduces clutch capacity, causing it to slip by a small amount using a slip feedback controller.

Entry into the tip-out mode 138 will reduce clutch capacity, causing it to slip by a small amount using a slip feedback controller. It is possible to exit from the tip-out mode to the shift mode if the shift flag indicates shifting is occurring. Exit to the soft-lock mode can take place when a tip-out timer has expired. Exit to the tip-in mode takes place when the transmission is not shifting and the throttle setting is increasing at a high rate and the throttle setting is at a minimum threshold value.

When the control sequence is in the shift mode, it is possible to exit to the soft-lock mode 132 if the gear shift is completed. The control strategy for this causes clutch pressure to increase, thereby locking the clutch. If dampening of oscillations is desired, the clutch may be slipped a small amount using a slip feedback controller.

The clutch starts slipping at the beginning of the ratio change phase of the shift mode and stops slipping slightly before the end of the shift. The desired slip of startup clutch profile is a function of speed ratio.

When the control routine is in the hard-lock mode 140, it is possible to exit to the shift mode, or to the soft-lock mode at low vehicle speeds, or to the tip-in mode when the transmission is not shifting and the throttle position is increasing at a higher rate and the throttle setting is above a threshold. Exit to the tip-out mode from the hard-lock mode can be accomplished when the transmission is not shifting and the throttle setting decreases at a high rate and the throttle setting is below a threshold value. The control strategy during operation in the hard-lock mode is expressed by the following equation:

pr_cmd=pr_cmd_old+delta pressure until max pressure is achieved

Figure 5:
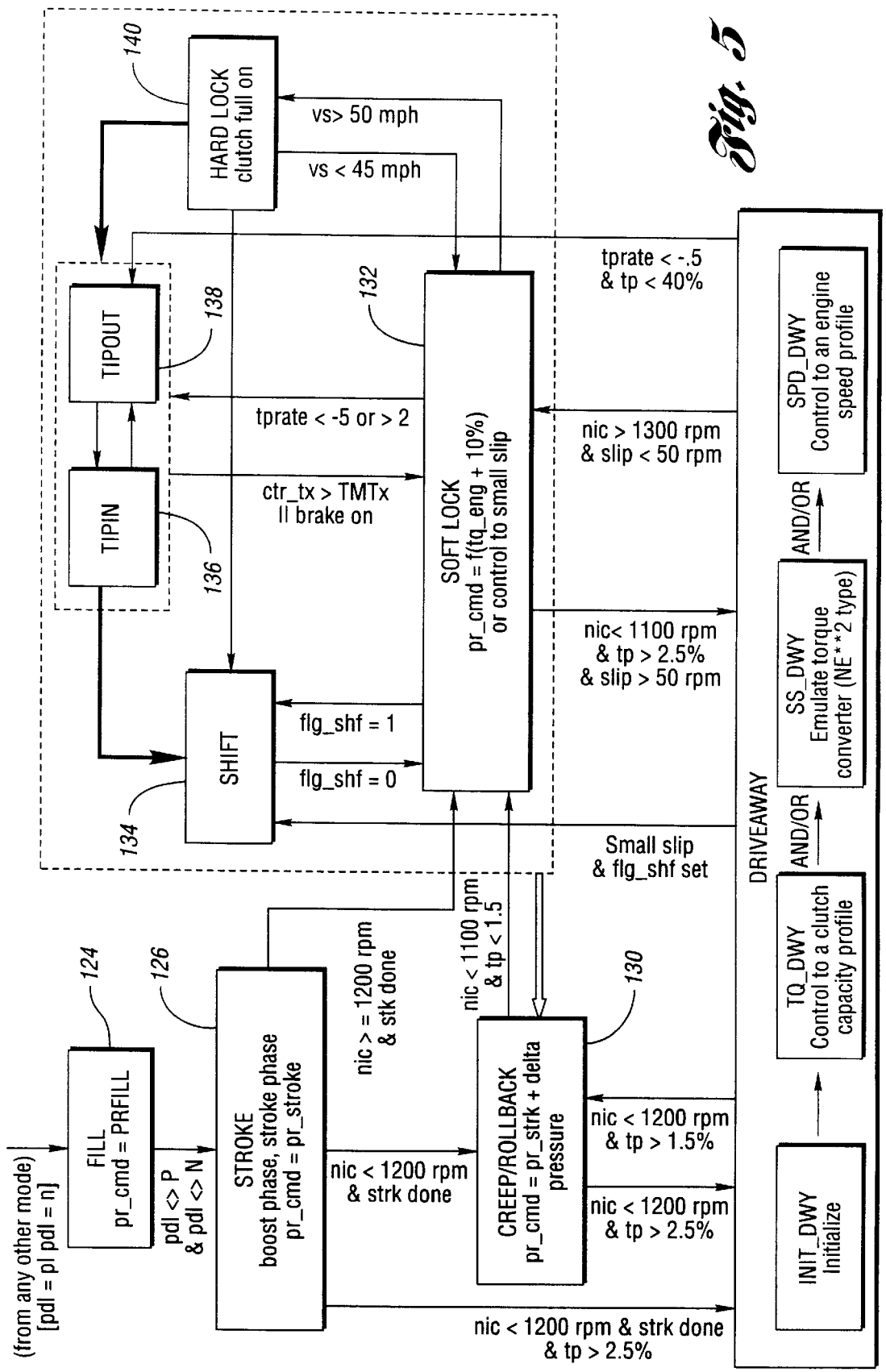
FIG. 5 is a detailed block diagram corresponding to the block diagram of FIG. 3 indicating the entry and exit conditions for each of the operating modes.

FIG. 5 shows a block diagram for the control strategy described in the preceding description. Indicated in FIG. 5 are the entry and exit conditions for each of the operating modes in accordance with the preceding discussion.

In FIGS. 3 and 5, the shift mode, the soft-lock mode, the tip-in and tip-out modes and the hard-lock mode are enclosed with a dotted line. That portion of the control sequence is used during driving. The portions of the diagram that are outside the dotted line are those portions that are used during startup of the vehicle.

The drive-away mode during startup is entered if the driver advances the throttle. If at that time the throttle setting is greater than 2.5 percent, for example, and if the transmission input speed is less than about 1000 rpm, and if the slip is greater than about 50 rpm, the drive-away mode will be entered.

When the vehicle is in the drive-away mode, heavy tip-in of the throttle may result in entry to the shift mode. If there is a slight tip-in, the routine may shift to the soft-lock mode.

The shift back and forth between the tip-in mode and the tip-out mode depends upon throttle position change rate only.

If the vehicle operates in the hard-lock mode and if the vehicle slows down, it is possible then to go to the soft-lock mode. For example, the speed at that time might be 5 mph.

If the routine is in the hard-lock mode and the vehicle speed is reduced below approximately 45 mph, the soft-lock mode may be entered for NVH reasons (noise, vibration and harshness). If the vehicle speed is above approximately 50 mph, the clutch will remain in the hard-lock mode.

Although a preferred embodiment of the invention has been described, modifications to the described control strategy may be made by persons skilled in the art without departing from the scope of the invention. All such modifications and equivalents thereof are included within the scope of the claims.

What is claimed is:

1. A method and control strategy for controlling engagement of a friction clutch in an automotive vehicle driveline having a throttle-controlled internal combustion engine and a geared transmission defining torque flow paths between the engine and a driven shaft, a driver-controlled ratio range selector for selecting forward ratio range, reverse and neutral, the clutch being disposed between the engine and torque input elements of the gearing, the transmission including an electronic controller for varying the torque-transmitting capacity of the clutch in response to changes in driveline variables;

the control strategy for the controller including establishing multiple operating modes for the transmission that are discrete, one with respect to the other;

establishing entry conditions for the driveline variables for entry into each operating mode;

establishing exit conditions for the driveline variables for exiting each operating mode;

measuring driveline input operating variables and driveline output operating variables; and transferring the measured operating variables to the electronic controller; the electronic controller responding to the measured operating variables to control the torque-transmitting capacity of the clutch consistent with each of the discrete operating modes whereby quick and smooth engagement of the friction clutch is effected;

wherein the operating modes include a stroke mode, a creep mode, a drive-away mode, a shift mode, a soft-lock mode, a hard-lock mode and tip-in and tip-out modes.

2. The method and control strategy set forth in claim 1 including the step of exiting the stroke mode and entering the creep mode when the input speed for the clutch is less than about 1200 rpm and the stroke mode is completed whereby vehicle creep is established when the transmission ratio range selector is not in neutral or park.

3. The method and control strategy set forth in claim 1 including the step of exiting the creep mode and entering the drive-away mode when the clutch input speed is less than about 1200 rpm and the engine throttle position is greater than about 2.5 percent thereby providing a smooth vehicle launch with maximum acceleration feel for a given engine throttle position.

4. The method and strategy set forth in claim 1 including the step of exiting the stroke mode and entering the drive-away mode when the clutch input speed is less than about 1200 rpm and the stroke mode is completed and the throttle position is greater than about 2.5 percent;

the method and strategy including further the step of exiting the stroke mode and entering the soft-lock mode when the clutch input speed is greater than about 1200 rpm and the stroke is completed.

5. The method and strategy set forth in claim 1 including the step of exiting the soft-lock mode and entering the drive-away mode when the clutch input speed is less than about 1100 rpm and the throttle position is greater than about 2.5 percent and the clutch slip is greater than about 50 rpm; and exiting the soft-lock mode and entering the shift mode when the transmission is engaging in a ratio change.

6. The method and strategy set forth in claim 1 including the step of exiting the soft-lock mode and entering the hard-lock mode when the vehicle speed is greater than about 50 mph.

7. The method and strategy set forth in claim 1 including the step of exiting the hard-lock mode and entering the soft-lock mode when the vehicle speed is less than about 45 mph; and exiting the hard-lock mode and entering the shift mode when the clutch is fully applied.

8. The method and strategy set forth in claim 1 including the step of exiting the soft-lock mode and entering the drive-away mode when the clutch input speed is less than about 1100 rpm and the throttle position is greater than 2.5 percent and the clutch slip is greater than about 50 rpm; and exiting the drive-away mode and entering the soft-lock mode when the clutch input speed is greater than about 1300 rpm.

9. The method and strategy set forth in claim 1 including the step of exiting the drive-away mode and entering the creep mode when the clutch input speed is less than about 1200 rpm and the throttle position is less than about 1.5 percent.

10. A method and control strategy for controlling engagement of a friction clutch in an automotive vehicle driveline having throttle-controlled internal combustion engines and general torque flow paths between the engine and a driven shaft, the clutch being disposed between the engine and torque input elements of the gearing, the transmission including an electronic controller and a solenoid-operated clutch pressure control valve for varying the torque-transmitting capacity of the clutch in response to changes in driveline variables;

the control strategy for the controller including establishing multiple operating modes for the transmission that are discrete, one with respect to the other;

establishing entry conditions for the driveline variables for entry into each operating mode;

establishing exit conditions for the driveline variables for exiting each operating mode;

measuring driveline input operating variables and driveline output operating variables;

transferring the measured operating variables to the electronic controller;

transferring to the solenoid-operated clutch control valve an electronic signal to effect a response to the measured operating variables to control actuating pressure for the clutch consistent with each of the discrete operating modes whereby quick and smooth engagement of the friction clutch is effected;

wherein the operating modes include a stroke mode, a creep mode, a drive-away mode, a shift mode, a soft-lock mode, a hard-lock mode and tip-in and tip-out modes.

11. The method and control strategy set forth in claim 10 including the step of exiting the stroke mode and entering the creep mode when the input speed for the clutch is less than about 1200 rpm and the stroke mode is completed.

12. The method and control strategy set forth in claim 10 including the step of exiting the creep mode and entering the drive-away mode when the clutch input speed is less than about 1200 rpm and the engine throttle position is greater than about 2.5 percent.

13. The method and strategy set forth in claim 10 including the step of exiting the stroke mode and entering the drive-away mode when the clutch input speed is less than about 1200 rpm and the stroke mode is completed and the throttle position is greater than about 2.5 percent;

the method and strategy including further the step of exiting the stroke mode and entering the soft-lock mode when the clutch input speed is greater than about 1200 rpm and the stroke is completed.

14. The method and strategy set forth in claim 10 including the step of exiting the soft-lock mode and entering the drive-away mode when the clutch input speed is less than about 1100 rpm and the throttle position is greater than about 2.5 percent and the clutch slip is greater than about 50 rpm;

exiting the soft-lock mode and entering the shift mode when the transmission is engaging in a ratio change; and exiting the soft-lock mode and entering the top-in and tip-out modes when the rate of change of throttle position is less than about 0.5°/sec. or greater than about 2°/sec.

15. The method and strategy set forth in claim 10 including the step of exiting the soft-lock mode and entering the hard-lock mode when the vehicle speed is greater than about 50 mph.

16. The method and strategy set forth in claim 10 including the step of exiting the hard-lock mode and entering the soft-lock mode when the vehicle speed is less than about 45 mph; and exiting the hard-lock mode and entering the shift mode when the clutch is fully applied.

17. The method and strategy set forth in claim 10 wherein, during the initial part of the drive-away mode, output torque and engine speed profiles are shaped by controlling engine speed to a desired profile using a closed-loop controller, whereby the engine speed profile can be customized.

18. The method and strategy set forth in claim 10 wherein, during the initial part of the drive-away mode, output torque and engine speed profiles are shaped thereby providing a clutch capacity profile base launch feel.

19. The method and strategy set forth in claim 10 wherein, during the initial part of the drive-away mode, the output torque and engine speed profiles are shaped thereby providing a launch feel that emulates a manual transmission launch feel.

* * * * *